United States Patent [19]

Ferrieu

[11] 4,453,039
[45] Jun. 5, 1984

[54] ARRANGEMENT FOR AVOIDING ANNOYING SUSTAINED OSCILLATIONS IN A CLOSED-LOOP SYSTEM AND LOUD-SPEAKING TELEPHONE SET EMPLOYING THIS ARRANGEMENT

[75] Inventor: Gilbert M. M. Ferrieu, Bievres, France

[73] Assignee: Telecommunications Radioelectriques et Telephoniques, Paris, France

[21] Appl. No.: 372,430

[22] Filed: Apr. 28, 1982

[30] Foreign Application Priority Data

May 8, 1981 [FR] France ................................ 81 09190

[51] Int. Cl.³ .......................... H04M 9/08; H04R 3/02
[52] U.S. Cl. ..................................... 179/81 B; 381/93; 330/151
[58] Field of Search ............... 179/1 FS, 1 HF, 1 VL, 179/81 A, 81 B, 100 L; 330/151; 381/83, 93, 107, 108

[56] References Cited

U.S. PATENT DOCUMENTS

| | | | |
|---|---|---|---|
| 3,825,843 | 7/1974 | Felsberg et al. | 330/151 X |
| 4,064,462 | 12/1977 | Goehler et al. | 330/151 X |
| 4,081,620 | 3/1978 | Goodman et al. | 179/1 VL X |
| 4,081,622 | 3/1978 | Clark et al. | 179/81 B |
| 4,382,398 | 5/1983 | O'Neill | 179/1 FS X |

FOREIGN PATENT DOCUMENTS

EP65335 11/1982 European Pat. Off. .......... 179/1 FS
2216111 10/1973 Fed. Rep. of Germany ...... 330/151

*Primary Examiner*—A. D. Pellinen
*Assistant Examiner*—Keith E. George
*Attorney, Agent, or Firm*—Thomas A. Briody; William J. Streeter

[57] ABSTRACT

Circuitry for avoiding sustained oscillations in a closed-loop system, particularly a loud-speaking telephone set. The object is to avoid sustained annoying oscillations in a looped system, such as a looped electro-acoustic system or a control system. The circuitry comprises a variable-gain amplifier (11) incorporated in a first path ($C_1$) which forms part of the loop. Connected between the input terminal (A) and the output terminal (B) of the said first path is a second path ($C_2$) having at least one part which is separate from the first path. A device is provided to ensure that the gain in the second path remains higher than the gain in the first path in the overall frequency band where the oscillations are liable to be produced. A signal (W) formed in the part of the second path which is separate from the first path is applied to the input of a linear regulator 13, which controls the variable-gain amplifier (11) of the first path and a variable-gain amplifier (12) of the second path so as to keep the signal at the input of the regulator (13) constant for a certain value of the signal (W) formed in the second path.

19 Claims, 10 Drawing Figures

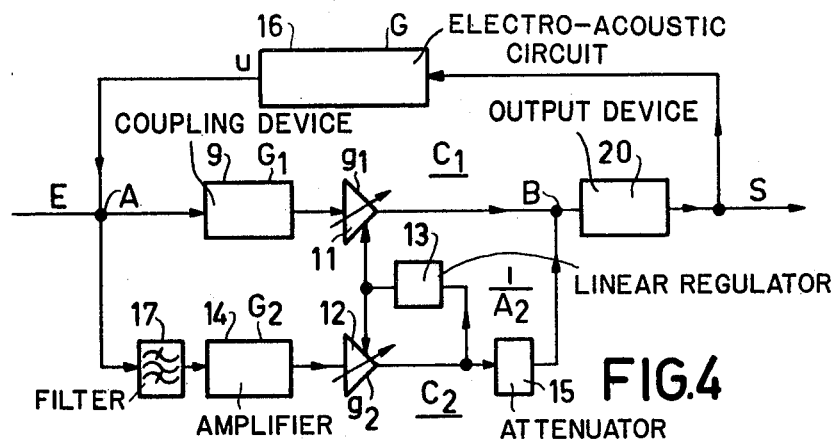
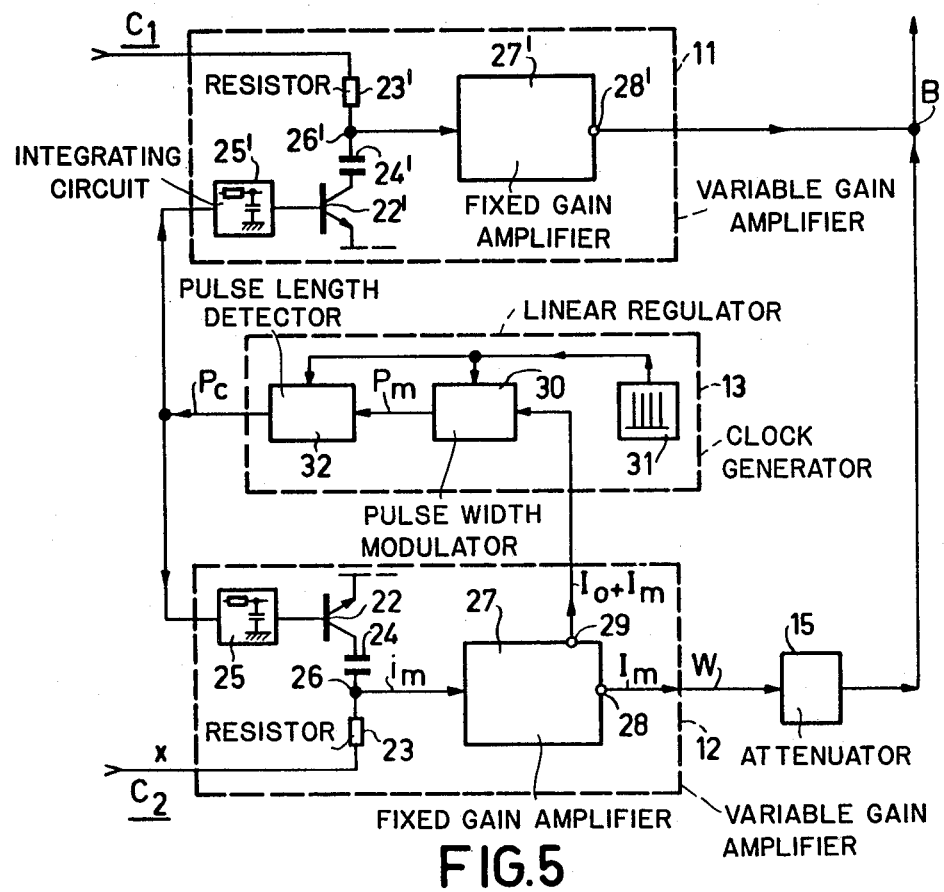

ARRANGEMENT FOR AVOIDING ANNOYING SUSTAINED OSCILLATIONS IN A CLOSED-LOOP SYSTEM AND LOUD-SPEAKING TELEPHONE SET EMPLOYING THIS ARRANGEMENT

BACKGROUND OF THE INVENTION

The invention relates to an arrangement for avoiding annoying, sustained oscillations in a closed-loop system, the arrangement comprising a variable-gain amplifier incorporated in a first path which forms part of the loop of the said system.

Among the closed-loop systems in which annoying sustained oscillations may be produced there are, for example, systems for controlling electrical or mechanical or physical quantities. It is known that during the design of such systems, the gain and phase conditions in the control loop must have proper attention paid to them in order to avoid sustained oscillations in the loop. But there is never a certainty that due to unforeseen circumstances, for example parasitic couplings or sudden perturbations, self-oscillations will not be produced which may attain high and even dangerous amplitudes in certain systems. A different type of closed-loop system is an electro-acoustical system which comprises, for example, a microphone and a loudspeaker which are coupled in any arbitrary manner by means of an electric circuit; if on the other hand these two transducers are coupled by means of an acoustic circuit, an electro-acoustic loop is obtained in which oscillations of a high amplitude may be produced which cause unacceptable howls. This phenomenon, which is known as the Larsen effect, may be produced in, for example, sound reproduction equipment or in loudspeaking telephone sets.

To avoid oscillations in an electro-acoustical loop the procedures which are generally employed include the provision in the loop of at least a variable amplifier or attenuator circuit, which is controlled in accordance with different criteria in order that the gain in the loop remains below unity. Thus, a procedure employed in loudspeaking telephone sets consists of checking, by means of two envelope detectors, whether the speech signal is present in the loudspeaker path or in the microphone path and producing a gain increase in the useful path and a gain reduction in the other path. These gain modifications which follow each other in both paths during a conversation are very unpleasant for the listeners and in addition this type of procedure is not very effective for the important acoustical couplings, as the gain control does not substantially depend on the coefficient of acoustic coupling.

Another procedure described in French Patent Application No. 2,461,412 also employs two signal envelope detectors in the two paths and a single amplifier in the loudspeaker path, the gain of which is varied by a difference signal between the output signal of the envelope detector of the microphone path and the output signal of the envelope detector of the loudspeaker path, weighted with a predetermined coefficient. For distances which are longer than a predetermined minimum distance between the loudspeaker and the microphone, the gain of the amplifier is in a constant ratio to the coefficient of acoustic coupling and the oscillations can only be avoided by means of this procedure below said minimum distance. In addition, the use of envelope detectors causes the reception to depend on the speech signals and particularly on the speech signal produced by a speaker who speaks into the microphone.

SUMMARY OF THE INVENTION

The present invention provides a different means to avoid annoying loop oscillations, by mitigating the disadvantages and the limitations of the prior art procedures. The invention not only relates to electro-acoustic loops, but also to all types of closed-loop systems such as control systems.

The invention is based on the idea of causing said loop oscillations, when the loop oscillation conditions have been created, to pass through a second path which has at least a distinct portion of the first path and controlling said oscillations by means of a regulator so as to bring them to a constant level which is low and not annoying in the remaining part of the loop.

According to the invention, a second path which has at least one part which is separate from the first path is formed between the input and output terminals of the first path, means being provided to ensure that the gain in the second path remains higher than the gain in the first path, in the overall frequency band where the oscillations are liable to be produced, a signal formed in the said part of the second path which is separate from the first path being applied to the input of a linear regulator controlling at least one variable-gain amplifier which forms part of the second path to ensure that the signal at the input of the said regulator remains constant from a certain value of the said signal formed in the second path.

In certain embodiments of the invention the second path is completely separate from the first path and comprises a variable-gain amplifier whose output signal is applied to the input of the said linear regulator, the latter simultaneously controlling from the input terminal which is used jointly by the two paths the said variable-gain amplifier of the second path and a variable-gain amplifier provided in the first path and/or a variable-gain amplifier provided in the first path from the output terminal which is jointly used by the two paths.

In further embodiments of the invention it is possible to omit one variable-gain amplifier, because of the fact that the first and second paths comprise one common variable-gain amplifier which is provided at the input terminal which is used jointly by the two paths and/or a variable-gain amplifier provided at the output terminal which is used jointly by the two paths, the one or the other of these variable-gain amplifiers jointly used by the two paths being controlled by the said linear regulator.

Advantageously, the non-annoying oscillations occurring in the loop which is closed by the second path are produced at a well-defined frequency. This result is preferably obtained by means of a filter having a narrow passband which is connected into that part of the second path which is different from the first path, before the spot where the signal is taken off which is applied to the input of the linear regulator, so as to selectively increase the gain in the second path.

In addition, in order to satisfy the gain conditions relative to the two paths it is possible to include a further filter in that part of the first path which is different from the second path, this filter increasing the gain in the same narrow passband as the filter of the second path. It is alternatively possible to provide such a filter before the input terminal which is used jointly by the two paths, after the output terminal which is used jointly by the two paths or in the parts which are used jointly by the two paths.

The arrangement in accordance with the invention can be advantageously employed in a loudspeaking telephone set, the coupling circuit coupling the set to the telephone line then being included in that part of the first path which is different from the second path. In the loop which will be denoted auxiliary loop hereinafter and which comprises the acoustic path between the loudspeaker and the microphone of the telephone set and which is closed by the second path, sustained amplitude oscillations are obtained which are controlled by the regulator to ensure that they are non-annoying and, in particular, inaudible; at the same time, annoying Larsen oscillations are prevented from being produced in the electro-acoustic loop, denoted main loop, which is closed by the first path, these annoying oscillations being produced owing to imperfections in the coupling circuit coupling the local subscriber's set or owing to an acoustic coupling in the remote subscriber's set.

The following description given by way of example with reference to the accompanying drawings will make it better understood how the invention can be put into effect.

FIG. 4 shows the arrangement in accordance with the invention used in a control system.

FIG. 5 shows an embodiment of the regulator and the two variable-gain amplifiers, controlled by the regulator.

DETAILED DISCLOSURE OF THE INVENTION

Figure 1:
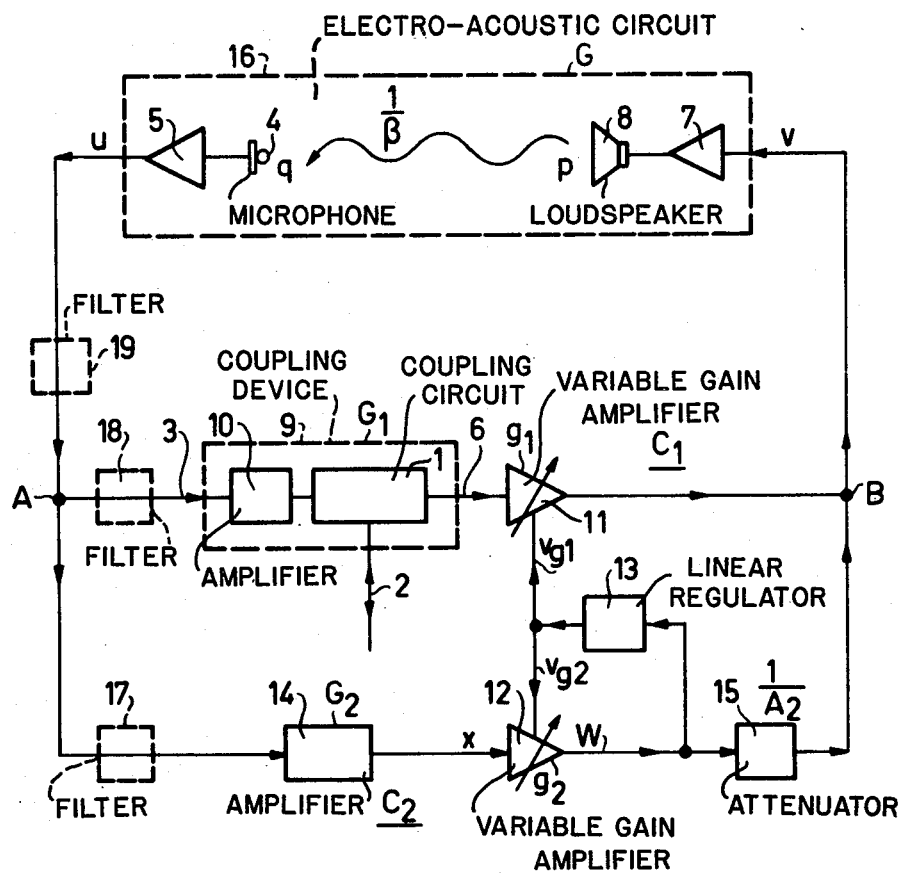
FIG. 1 shows the arrangement in accordance with the invention used in a loudspeaking telephone set.

FIG. 1 shows an electro-acoustical loop, formed, for example, by a loudspeaking telephone set. Said telephone set comprises a coupling circuit 1 which couples the telephone line 2 to the transmission path 3 of the set which is provided with the microphone 4 and an amplifier 5, and also to the receiving path 6 of the set which is provided with the receiver amplifier 7 and the loudspeaker 8. Between the loudspeaker 8 and the microphone 4 there is a certain degree of acoustic coupling, which in particular depends on the distance between these transducers. and their orientation and which may vary in telephone sets of the type usually referred to as "amplified reception", the microphone of which, which forms a fixed part of the combination, has an indeterminate position with respect to the loudspeaker. This coupling may be characterized by a coupling coefficient $(1/\beta)<1, \beta$ being the attenuation of the acoustic power transmitted by the loudspeaker and reaching the microphone.

Moreover, due to inevitable imperfections in the circuit 1, the signal appearing in the transmission path 3 of the set is not wholly retransmitted over the telephone line 2 and a fraction of this signal is found in the receiving path 6 of the set. A further inadvertent coupling between the transmission and receiving paths of the local set shown in the Figure may also be produced by the path incorporating the telephone line 2, which is connected to a remote loudspeaker in which there also exists an acoustic coupling between the loudspeaker and the microphone. Whatever the origin of the inadvertent coupling between the transmitting path 3 and the receiving path 6 of the telephone set it is possible to establish a device 9 arranged between the transmission and receiving paths of the telephone set, and having a defined gain $G_1$ as the standard of the ratio between the signal appearing on the transmission path 3 and the signal appearing on the receiving path 6 of the set. No change is made to the generality of the definition of said device 9 if a circuit 10, for example an amplifier, is arranged in series with the coupling circuit 1, the gain $G_1$ then including the gain of said circuit 10.

The acoustic coupling between the loudspeaker 8 and the microphone 4 and the unwanted coupling produced in the device 9 between the transmission path 3 and the receiving path 6 of the telephone set forms an electro-acoustic loop in which oscillations may come into being if the gain of the loop is equal to or higher than unity. The frequency of these oscillations is not accurately known and is situated in the passband of the components which are included in the loop, that is to say approximately 300–4000 Hz. The amplitude of these oscillations is only limited by the saturation of the components of the loop.

In order to avoid these unwanted loop oscillations which render the use of the telephone set substantially impossible, it is known to include a variable-gain amplifier 11 in the receiving path 6 of the set and to control this gain $g_1$ from the envelope signal of the signals of the transmission and receiving paths. This procedure of controlling the gain is not adequate for a high acoustic coupling and causes the gain $g_1$ to depend on the useful speech signals.

The invention proceeds in a quite different way, rendering it possible to avoid these disadvantages. According to the invention, connected to the terminals A and B of a first path $C_1$ of the loop incorporating the device 9 and the variable-gain amplifier 11 there is a second path $C_2$ incorporating a further variable-gain amplifier 12. The gain $g_2$ of the amplifier 12 is controlled by a linear regulator 13 which receives as its input the signal W produced in the second path at the output of the amplifier 12 and which produces a gain-control signal $V_{g2}$ in such a way that the level of the signal W is kept constant beyond a certain value of the input signal x of the amplifier 12.

Figure 2:
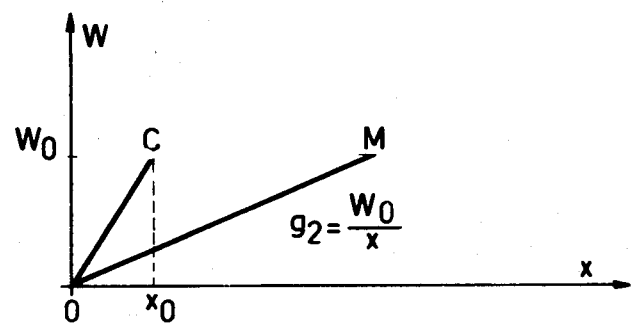
FIG. 2 shows the characteristic of the regulator employed in the arrangement in accordance with the invention.

FIG. 2 shows the characteristic of the output signal W as a function of the input signal x of the amplifier 12 which is so controlled. Up to a value $x_o$ of the input signal x, for which the output signal has a value $W_o$, the gain $g_2$ of the amplifier is constant and equal to a maximum value $g_{2M}=W_o/x_o$, which is determined by the slop of the line OC. Beyond $x_o$ the level of the output signal W remains constant and equal to $W_o$. For any arbitrary value x of the input signal the operating point of the amplifier establishes itself at M and the gain of the amplifier $g_2=W_o/x$ decreases when x increases. The important fact is stressed here that with the linear regulator 13 associated with the amplifier 12, the last-mentioned amplifier does not introduce any non-linearity in the second path.

The amplifier 11 in the first path $C_1$ is controlled by a gain-control signal $v_{g1}$ supplied by the regulator 13 in such a way that its gain $g_1$ responds to the gain $g_2$ of the amplifier 12 in the second path $C_2$. At each instant the gain $g_2$ of the amplifier 11 may be equal or proportional to the gain $g_2$ of the amplifier 12. If the two amplifiers 11 and 12 are of the same construction, the two control signals $v_{g1}$ and $v_{g2}$ may be equal and may be obtained from the same output of the regulator as shown in the Figure. Finally, means are provided in the one and/or in the other one of the two paths so as to ensure that the gain in the second path $C_2$ remains higher than the gain in the first path $C_1$ in the overall frequency band where the oscillations are likely to occur. In FIG. 1, these means are represented by the amplifier 14 having a gain $G_2$, which is arranged in the second path $C_2$ before the variable-gain amplifier 12 and is preferably associated with an attenuator 15 having a gain $1/A_2$, which is connected between the output of the amplifier 12 and the output terminal B which is used jointly by the two paths. The above-described notations being used, this gain condition in the two paths may be written as:

$$G_2 \cdot (1/A_2) \cdot g_2 > G_1 \cdot g_1 \tag{1}$$

It should be noted here that this condition (1) must be realized for every possible frequency of the loop oscillations, that is to say, in the example chosen here, for every frequency in the band 300–4000 Hz.

In the event that the two amplifiers 11 and 12 are identical and controlled by the same signals, condition (1) becomes:

$$G_2 \cdot (1/A_2) > G_1$$

To explain how the system of the invention operates and to demonstrate that it is possible to avoid annoying loop oscillations therewith it is advantageous to define the gain G of an electro-acoustic circuit which is enclosed by the frame 16 and comprises the loudspeaker 8 and its amplifier 7, the microphone 4 and its amplifier 5, and finally the acoustic path between the loudspeaker and the microphone, defined by the coupling coefficient $1/\beta$.

This gain G may be defined as the coefficient of the ratio between the signal v applied to the amplifier 7 and the signal u produced by the amplifier 5. Several quantities may be defined to express said gain G.

The acoustic power up to the output of the loudspeaker is denoted p and the acoustic power just behind the microphone is denoted q. Obviously it is then apparent that:

$$(p/q) = (1/\beta) \tag{2}$$

To introduce the transduction factor of the loudspeaker it is possible to define a nominal acoustic power $p_o$ supplied by the loudspeaker 8 and which would be produced by a signal $v_o$ at the input of the amplifier 7. The transduction factor of the assembly formed by the amplifier 7 and the loudspeaker 8 is $$\left[ \frac{p_o}{v_o} \right].$$

In the range in which said amplifier-loudspeaker assembly is linear, it may be written that:

$$p = v \left[ \frac{p_o}{v_o} \right] \tag{3}$$

To introduce the transduction factor of the microphone it is possible to define an acoustic power $q_o$ measured just before the microphone and produced by a speaker which produces an acoustic power $Kp_o$ (K being a constant) and situated at a nominal distance characterized by a coupling coefficient $1/\beta$. A signal $u_o$ at the output of the amplifier 5 corresponds to this acoustic power $$q_o = K \frac{p_o}{\beta_o}.$$

The transduction factor of the assembly formed by the microphone 4 and the amplifier 5 is $$\left[ \frac{u_o}{q_o} \right] = \left[ \frac{u_o}{Kp_o} \cdot \beta_o \right].$$

In this range in which said microphone-amplifier assembly is linear, it can be written that:

$$u = q \left[ \frac{u_o}{Kp_o} \cdot \beta_o \right] \tag{4}$$

Taking account of the relations (2), (3) and (4) the gain G of the electro-acoustic circuit 16 can be brought to the form:

$$G = \frac{u}{v} = \frac{\beta_o}{\beta} \cdot \frac{u_o}{v_o} \cdot \frac{1}{K} \tag{5}$$

Since, in accordance with the condition (1) to be satisfied, the gain in the second path $C_2$ between A and B is higher than the gain in the first path $C_1$ oscillations can only be present in the auxiliary loop formed by the electro-acoustic circuit 16 and the second path $C_2$ and cannot establish themselves in the main loop formed by the circuit 16 and the first path $C_1$. Let it first be assumed that in said auxiliary loop there is no speech signal produced by the microphone 4 or coming from the telephone line 2. There are no oscillations if the gain in this auxiliary loop is below unity, that is to say if:

$$G \cdot G_2 \cdot (1/A_2) \cdot g_2 < 1 \tag{6}$$

In this inequality, the gain $g_2$ of the amplifier 12 must be given its maximum value $g_{2M}$, defined in the foregoing. As in accordance with formula (5) the gain G is proportional to the coupling coefficient $1/\beta$ between the loudspeaker and the microphone, the inequality (6) simply confirms that there are no oscillations if said coupling coefficient is lower than a predetermined value.

If the coupling coefficient between the loudspeaker and the microphone increases, the gain G increases and above a predetermined value of the coupling coefficient the inequality (6) is no longer satisfied. This results in oscillations starting in the auxiliary loop formed by the circuit 16 and the second path $C_2$. The linear regulator 13 causes a decrease of the gain $g_2$ of the amplifier 12 in such a way that the amplitude of these oscillations at the output of the said amplifier remains limited to the value $W_o$. The output signal $W_o/A_2$ of the attenuator circuit 15 then has a value which is sufficiently low to ensure that all the components of the loop, particularly the amplifiers 5 and 7 of the circuit 16, operate in the linear mode. For this oscillating mode the total gain of the loop establishes itself at the value 1, that is to say it can be written that:

$$G \cdot G_2 \cdot (1/A_2) \cdot g_2 = 1 \quad (7)$$

Since the components of the circuit 16 operate in the linear mode, the formula (5) which furnishes the gain G may be employed and by combining the formulae (5) and (7) it is easily obtained that:

$$g_2 = \frac{\beta}{\beta_o} \left[ \frac{A_2}{G_2} \cdot \frac{v_o}{u_o} \cdot K \right] \quad (8)$$

This formula (8) shows that for this oscillating mode in the auxiliary loop formed by the circuit 16 and the second path $C_2$ the gain $g_2$ of the amplifier 12 establishes itself at a value which is proportional to the acoustic attenuation factor $\beta$ between the loudspeaker and the microphone, which itself is substantially proportional to the distance between the two transducers.

The gain of the amplifier 11 in the first path, which responds to the gain $g_2$ establishes itself therefore automatically also at a value which is proportional to the acoustic attenuation factor $\beta$, that is to say substantially proportional to the distance between the loudspeaker and the microphone. This gain $g_1$ varies in the same sense as the gain $g_2$, which renders it possible to satisfy the condition (1) in all circumstances. This condition (1) being satisfied, the total gain in the main loop formed by the circuit 16 closed by the first path $C_1$ always remains below unity, so that this first path $C_1$ does not contribute to the production of high-amplitude and annoying Larsen oscillations at the terminals of the electro-acoustic circuit 16.

Thus, with the device in accordance with the invention, when the acoustic attenuation factor becomes sufficiently low to create oscillating conditions in the loop these oscillations are forced to pass through the second path $C_2$, particularly because the gain $g_1$ of the amplifier 11 of the first path $C_1$ responds to the gain $g_2$ of the amplifier 12 of the second path. In the second path the loop oscillations are controlled in such a way that they are not annoying in the electro-acoustic circuit 16, that is to say they are inaudible and do not saturate the amplifiers 7 and 5; thus, for a given maximum amplitude $W_o$ of the oscillations at the output of the amplifier 12 it is always possible to increase the attenuation factor $A_2$ of the circuit 15 so as to ensure that the amplitude of the oscillations at the input of the circuit 16 is extremely small and not annoying, the gain $G_2$ of the circuit 14 being increased in a corresponding way to satisfy the condition (1). The signal produced at the output terminal B by the oscillations circulating in the second path $C_2$ has the fixed value $V_L = W_o/A_2$.

Let now the case be considered in which the first path $C_1$ and the electro-acoustic circuit 16 are the source of the useful speech signals. Let it first be assumed that the speech signal produced by the microphone 4 is totally directed, starting from point A, along the first path $A_1$. Loop oscillations may then come into existence in the second path $C_2$, exactly the same as described in the foregoing, without being affected by the speech signal coming from the microphone. At point B, these loop oscillations have a very small amplitude and superpose themselves on the speech signal coming from the telephone line 2 via the output of the first path $C_1$. A listener in front of the loudspeaker 8 will not observe these loop oscillations of a very small amplitude. In the hypothetical case posed above, the gain $g_2$ of the amplifier 12 and consequently $g_1$ of the amplifier 11 of the first path are not influenced by the speech signal coming from the microphone 4 and only depend on the acoustic coupling coefficient $\beta$.

Actually, if no precautions are taken, there is a risk that a fraction of the signal coming from the microphone 4 is applied to the second path $C_2$ and disturbs the regulation of the amplitude of the loop oscillations by means of the regulator 13. In that event, the gain $g_2$ of the amplifier 12 and consequently the gain $g_1$ of the amplifier 11 will not only depend on the acoustic coupling coefficient, but also on the amplitude of the speech signal coming from microphone 4. A means to avoid this disadvantage is to provide a filter 17 which is indicated by means of dotted lines in the Figure in the second path $C_2$ before the amplifier 12. The gain $G_2$ in the second path then includes the gain of the amplifier 14 and the filter 17.

If, in the first path $C_1$, the gain for the frequencies above, for example, 3000 Hz is higher than the gain for the frequencies lower than 3000 Hz, it is possible to use a high-pass filter as the filter 17, which high-pass filter increases the gain in the second path for the frequencies higher than 3000 Hz. The condition (1) is thus easily satisfied and the speech signals affect the regulation procedure of the loop oscillations to a lesser extent. These loop oscillations occur at a frequency above 3000 Hz but still poorly defined, which is a disadvantage.

It would be more advantageous if the filter 17 were a bandpass filter having a very narrow passband. This filter selectively increases the gain $G_2$ in its passband and establishes an adequate phase shift so as to ensure that the gain in the auxiliary loop formed by the circuit 16 and the second path $C_2$ may take a positive value in the said passband and that the oscillations in this auxiliary loop establish themselves substantially at the central frequency of the said passband, independent of the acoustic coupling between the loudspeaker and the microphone; at the same time the speech signals in the second path have a very low level compared with the loop oscillations and do not substantially disturb the regulation of the amplitude of these oscillations.

It should here be noted that with a filter 17 having a narrow passband it becomes much easier to satisfy the condition (1) which ensures that the loop oscillations pass only via the second path $C_2$. To satisfy this condition it is sufficient that the gain of the second path for the central frequency of the narrow band of the filter 17 is superior to the gain provided by the first path for all the frequencies of the band of said first path (for example 300–4000 Hz). It becomes still easier to satisfy this condition (1) by providing a filter 18, which is represented by the dotted line in the first path, increasing the gain in the same narrow passband as the filter 17. The gain $G_1$ in the first path then includes the gain of the device 9 and the filter 18. This filter 18 selectively increases the gain $G_1$ in its passband, so that the gain of the first path $C_1$ provides a maximum value in said narrow passband of the filter 18. To satisfy the condition (1) and consequently to ensure that the loop oscillations pass only along the second path $C_2$ it is then sufficient that the gain of the second path $C_2$ be higher than the gain of the first path $C_1$ for the common central frequencies of the passbands of the filters 17 and 18. It will be seen here that the filter 18 causes substantially no perturbations in the speech signals, because of its narrow band. It will be obvious that the amplifier 14 and the filter 17 on the one hand and the amplifier 10 and the filter 18 on the other hand may be in the form of two selective amplifiers. Finally, instead of employing a filter 18 in the first path $C_1$ it would alternatively be possible to employ a filter 19, which is represented by dotted lines and is provided in the path between the output of the amplifier 5 and the input terminal A which is used jointly by the two paths. As said filter 19 increases the gain in the same narrow passband as the filter 17, the condition (1) is of necessity satisfied automatically and the loop oscillations at the central frequencies of the two filters 17 and 18 pass via the second path. Finally, it will be obvious that in the above-described variant in which the filter 17 of the second path is a highpass filter which increases the gain $G_2$ for the frequencies higher than for example 3000 Hz, it is alternatively possible to employ a filter 18 or a highpass filter 19, but which a small attenuation difference between the transmitted high-frequency band and the attenuated low-frequency band, in order to prevent the speech signals from being distorted to a considerable extent.

Several different variations of the arrangement in accordance with the invention are possible which will now be described with reference to FIG. 3 which shows circuit diagrams corresponding to some of the possible variations. In these circuit diagrams the components shown in the circuit diagram of FIG. 1 which are essential and sufficient for an understanding of the description are given the same reference numerals, namely the electro-acoustic circuit 16 having a gain G, the device 9 having a gain $G_1$ provided in the first path $C_1$, the device 14 having a gain $G_2$ and the attenuator circuit having a gain $1/A_2$ provided in the second path $C_2$ and finally the linear regulator 13. Also the amplifiers 11 and 12 having the respective gain $g_1$ and $g_2$ may be used, as will be described hereinafter. For the sake of simplicity the filters 17, 18, 19 which are shown by means of dotted lines in FIG. 1 have been omitted.

Figure 3A:
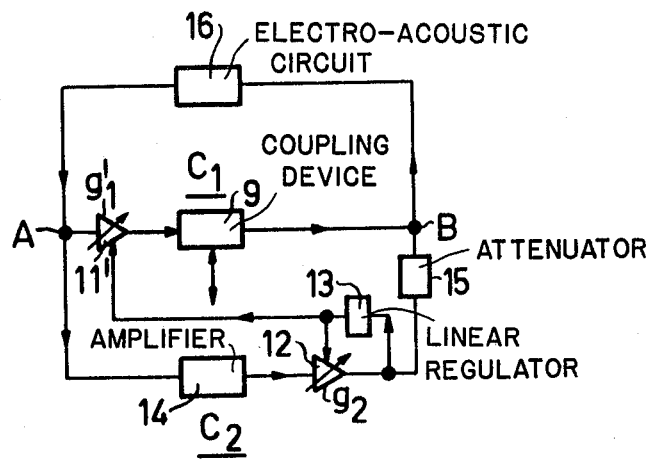
FIG. 3 shows the diagrams 3a to 3f corresponding to the variations in the arrangements in accordance with the invention.

In the arrangement shown in FIG. 3a, the two paths $C_1$ and $C_2$ connected between the terminals A and B are absolutely separate, as in the arrangement shown in the FIG. 1. The difference between the arrangement shown in the FIG. 3a and the arrangement of FIG. 1 is that the variable-gain amplifier of the first path is provided between the input terminal A which is used jointly by the two paths and the device 9, instead of being provided between the device 9 and the common output terminal B. In its new position, this variable-gain amplifier of the first path is given the reference numeral 11' and has a gain $g'_1$. It is controlled in exactly the same manner as the amplifier 11 of the FIG. 1. As regards the control of the Larsen oscillations, everything described for the arrangement of FIG. 1 is also wholly valid for the arrangement shown in FIG. 3a. In particular, the Larsen oscillations are limited to a small and unannoying amplitude having at the terminal B the fixed value $v_L = W_o/A_2$, $W_o$ being, as explained with reference to FIG. 2, the maximum fixed value of the signal W applied by the variable-gain amplifier 12 to the input of the linear regulator 13.

In a further variation, not shown, the arrangements shown in FIGS. 1 and 3a can be combined by employing two variable-gain amplifiers 11 and 11' provided in the first path on both sides of the device 9 and both controlled by the signal processed by the regulator 13.

Figure 3B:
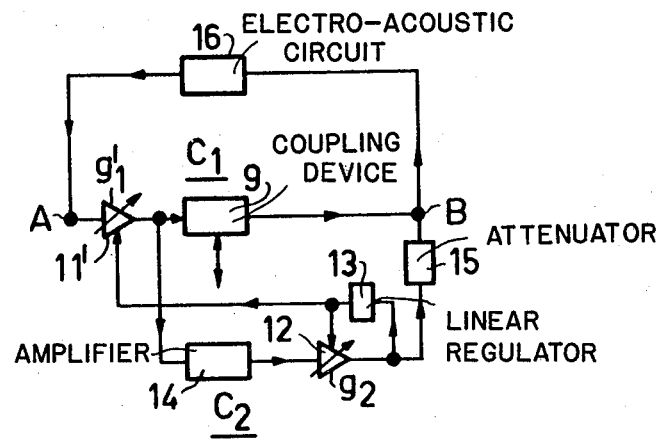

In the arrangement shown in FIG. 3b the two paths $C_1$ and $C_2$ connected between the terminals A and B are not absolute separate. The circuit diagram of FIG. 3b differs from the circuit arrangement shown in the FIG. 3a in that the input of the device 14 of the second path is not connected to terminal A but to the output of the variable-gain amplifier 11'. When the terminal A is always considered to be the input terminal which is used jointly by the two paths $C_1$ and $C_2$ the amplifier 11' is used jointly by these two paths, while after the output of the amplifier 11' to the terminal B the two paths have separate parts. If measures are taken to ensure that in the separate parts the second path has a gain which is higher than the gain of the first path it is obtained in this arrangement 3b that the Larsen oscillations are only produced in the part of the second path which is separate from the first path and that the amplitude of these oscillations is small and unannoying, being limited at the terminal B to the fixed value $v_L = W_o/A_2$. In a variation, not shown, of the arrangement of FIG. 3b, the linear regulator 13 may control, in addition to the variable-gain amplifiers 12 and 11', a variable-gain amplifier, not shown, which is provided between the output of the device 9 and the terminal B.

Figure 3C:
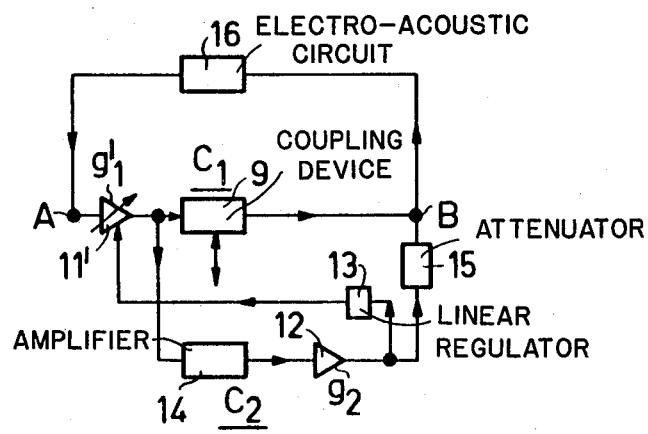

The arrangement of FIG. 3c may be considered to be a further improvement of the arrangement of FIG. 3b as it is possible to do without one variable-gain amplifier. It is different in that the amplifier 12 of the second path is no longer controlled by the regulator 13, and consequently has a fixed gain $g_2$. In the arrangement of FIG. 3c, taking account of the fact that the amplifier 11' having the gain $g'_1$ forms part of the first as well as of the second paths between the terminals A and B, it can be said that the regulator 13 acts on the gain $g'_1$ of the amplifier 11' for keeping the signal W formed in the second path at the output of the amplifier link 11', 14, 12 constant and equal to $W_o$, which signal is to be applied to the input of the regulator 13. The amplitude of the oscillations on the terminal B is still limited to a low and fixed value ($W_o/A_2$). In a variation, not shown, of the arrangement of FIG. 3c the regulator 13 can inter alia control a variable-gain amplifier provided between the output of the device 9 and the terminal B.

Figure 3D:
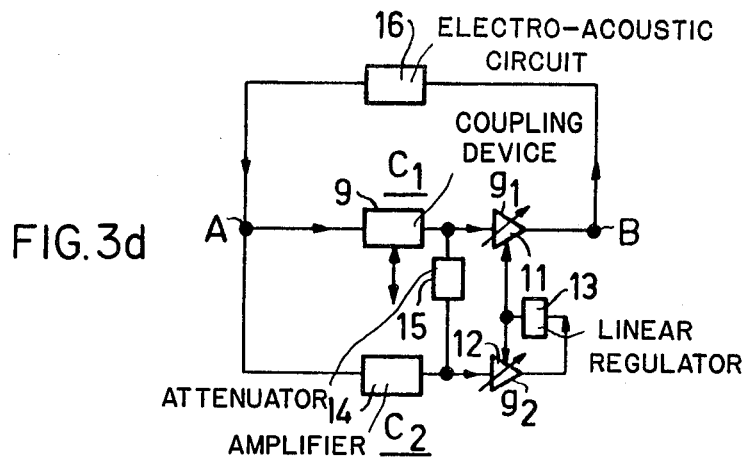

In the arrangement shown in FIG. 3d the two paths $C_1$ and $C_2$ connected between the two terminals A and B are also not absolute separate. When the arrangement of FIG. 3d is compared with the arrangement of FIG. 1 it will be seen that they differ in that the attenuator circuit having a gain ($1/A_2$) is connected between the output of the device 14 and the input of the variable-gain amplifier 11. When the terminal B is still considered to be the output terminal which is used jointly by the two paths $C_1$ and $C_2$, these two paths have the amplifier 11 in common. The separate parts of the two paths comprising the arrangement 9 for the first path $C_1$ and the cascade arrangement of the device 14 and the attenuator circuit 15 for the second path $C_2$ are connected between the terminal A and the input of the amplifier 11. It should be noted that in this arrangement of FIG. 3d the amplifier 12 is not incorporated in the second path. A signal is formed in that part of the second path which is separate from the first path, in a place situated between the device 14 and the attenuator circuit 15 and this signal is applied to the input of the regulator 13 by means of the variable-gain amplifier 12. This regulator 13 controls the gain $g_2$ of the amplifier 12 and the gain $g_1$ of the amplifier 1 in such a manner that the signal W coming from amplifier 12 and applied to the input of the regulator 13 is kept at a constant value $W_o$. It can be easily demonstrated that on the terminal B the Larsen oscillations have an amplitude which is limited to the value $$v_L = \frac{W_o}{A_2} \frac{g_1}{g_2}$$

which is a fixed value because the gains $g_1$ and $g_2$ of the amplifiers 11 and 12 are controlled by the same signal. Particularly when the amplifiers are identical, $g_1=g_2$ and the limit value of the amplitude of the Larsen oscillations is $v_L=(W_o/A_2)$. In a variation, not shown, of the arrangement of FIG. 3d the regulator 13 may control inter alia a variable-gain amplifier which must then be provided between the terminal A and the input of the device 9.

Figure 3E:
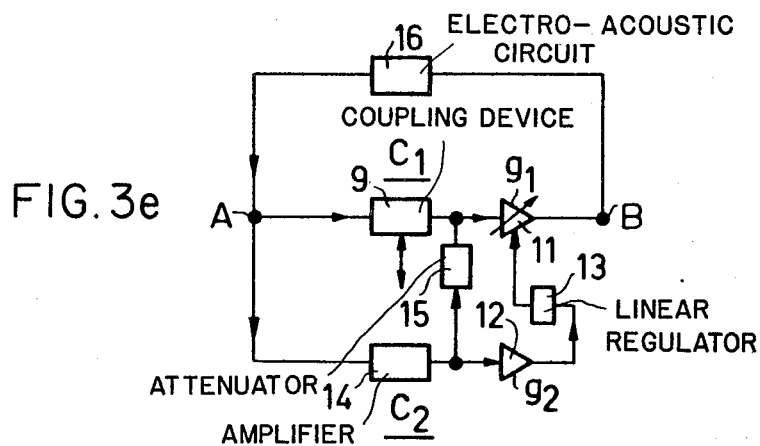

The arrangement shown in FIG. 3e is a further improvement of the arrangement shown in FIG. 3d, an improvement which is comparable to the improvement effected in the arrangement of FIG. 3c with respect to the arrangement shown in FIG. 3b. This arrangement 3e differs from the arrangement 3d in that the gain $g_2$ of the amplifier 12 is no longer controlled by the regulator 13 and consequently remains fixed. The regulator 13 acts on the gain $g_1$ of the amplifier 11 which is assumed to be part of the second path, so that the signal formed in the second path between the device 14 and the attenuator circuit 15 and amplifier thereafter in the amplifier 12 having a fixed gain $g_2$, is applied to the input of the regulator with a fixed amplitude $W_o$. In the arrangement of FIG. 3e the amplitudes of the Larsen oscillations on the terminal B have the value $$v_L = \frac{W_o}{A_2} \frac{g_1}{g_2}.$$

But, in contrast with the variations described in the foregoing, this value $v_L$ is variable since the gain $g_1$ is variable and the gain $g_2$ is fixed. It is nevertheless always possible to choose an attenuation coefficient $A_2$ and a gain $g_2$ in such a manner that the variable amplitude of the Larsen oscillations remains low and non-annoying. As the amplifier 11 having the variable gain $g_1$ is located in the path of the useful speech signals which come from the telephone line and are to be applied to the loudspeaker incorporated in the electro-acoustic device 16, it can be said that the variation shown in FIG. 3e makes it possible to obtain on the terminal B a constant ratio between the useful speech signal and the noise generated by the unannoying Larsen oscillations produced by means of the second path. In a variation, not shown, of the arrangement of FIG. 3e the regulator 13 might inter alia control a variable-gain amplifier provided between the terminal A and the device 9.

Figure 3F:
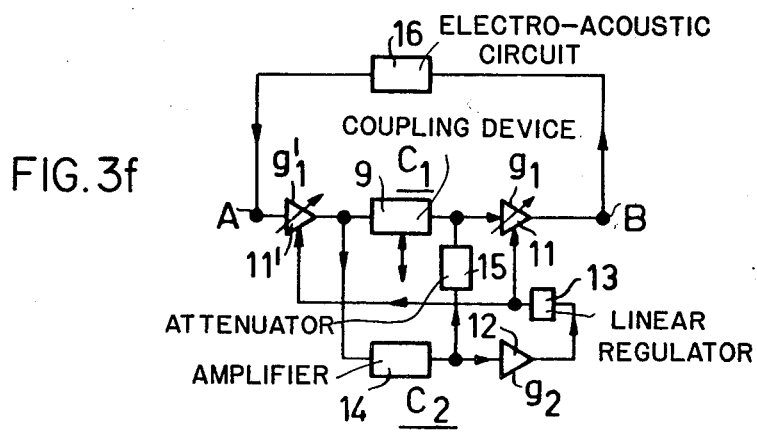

The arrangement of FIG. 3f differs from the arrangement of FIG. 3e in that an amplifier 11' having a variable gain $g'_1$, controlled by the regulator 13, is provided between the terminal A and the arrangement 9 and furthermore in that the input of the device 14 is connected between the amplifier 11' and the device 9. Thus, in this arrangement of FIG. 3f the variable-gain amplifiers 11' and 11, which are connected to the terminal A and the terminal B, respectively are used jointly by the two paths $C_1$ and $C_2$ and are controlled by the same signal supplied by the regulator 13. The separate parts of the two paths comprise the same elements as the arrangement shown in FIG. 3e and the regulator 13 has its input connected in the same manner to the second path, by means of the amplifier 12 having a fixed gain $g_2$. As in the arrangement shown in FIG. 3f, the amplitude of the Larsen oscillations on the terminal B has the value $$v_L = \frac{W_o}{A_2} \frac{g_1}{g_2}$$

which varies in the same way as $g_1$.

It can be seen that in the arrangements of FIGS. 3c, 3e and 3f where an amplifier 12 having a fixed gain $g_2$ is described, it is possible to omit this amplifier completely, if a gain $g_2$ equal to unity is sufficient for a correct operation of the arrangements.

In the arrangements shown in FIGS. 3a to 3f it is advantageous to provide filters having the same characteristics and the same functions as the filters 17, 18 and 19 in the arrangement shown in FIG. 1. A filter having the function of the filter 17 would then be provided in that part of the second path which is separate from the first path. A filter having the function of the filter 18 would then be provided in that part of the first path which is separate from the second path, a filter having the function of the filter 19 would then be disposed in the parts which are common to the main and the auxiliary loops.

In the foregoing the use of the invention for an electro-acoustic system which is inadvertently looped by acoustic and/or electric coupling is described. However, the invention is suitable for use in a more general way in all systems in which a loop may be formed in which uncontrolled oscillations of a high amplitude may be produced. So the invention may be used in all types of control systems, as shown in FIG. 4.

FIG. 4 shows the well known circuit diagram of a control system intended to have any output quantity S respond to an electric input signal E. To make this more readily understood the same references and the same notations are used as in FIG. 1 to indicate the corresponding components and quantities. The input signal E is applied via the point A to the forward path of the control system, comprising the cascade arrangement of the device 9 having a gain $G_1$, the variable-gain amplifier 11 and finally the device 20 which supplies the output quantity S. The feedback path of the control system is connected between the output of the device 20 and the point A. This feedback path is represented by the device 16 which has a transfer function modulus G. In response to the output quantity S the device 16 produces an electric signal u which is added with a suitable phase to the input signal E. During adjustment of this control system or in abnormal circumstances during its operation it may happen that unwanted oscillations arise in the loop formed by the forward path and the feedback path and that the output quantity S attains uncontrolled and dangerously high amplitudes.

The invention renders it possible to avoid loop oscillations of this type. By employing, for example, the embodiment shown in FIG. 1, the invention is utilized by connecting a second path $C_2$ which comprises in accordance with one of the variations of FIG. 1 a filter 17 having a narrow passband and an amplifier 14 which together have a gain $G_2$, an amplifier 12 having a variable gain $G_2$ and an attenuator 15 having a gain $1/A_2$ to the terminals A and B of a first path $C_1$ of the control loop which comprises the components 9 and 11. The linear regulator 13 regulates the output signal of the amplifier 12 and renders it possible to have the gain $g_1$ of the amplifier 11 respond to the gain $g_2$ of the amplifier 12. Everything which has been described for the electro-acoustic system shown in FIG. 1 remains valid. Particularly, the loop oscillations which may come into being are passed along the second path $C_2$ and in said second path their amplitude is controlled by the regulator 13. Thanks to the attenuator circuit 15 the amplitude of these oscillations can be brought to a very low, unannoying value at the output S of the control system.

An embodiment of the assembly formed by the variable-gain amplifier 12 and its regulator 13, and by the variable-gain amplifier 11 is shown in FIG. 5. This embodiment utilizes the principle of the regulating device which is described in detail in the nonpublished French patent application filed by Applicants on Mar. 28, 1980 under No. 80 07 055.

In accordance with FIG. 5, the amplifier 12 which is provided in the second path $C_2$ comprises a npn transistor 22 the emitter of which is connected to a negative supply terminal which serves as a reference, the collector of which receives the input signal x of the amplifier via the series arrangement of the resistor 23 and the capacitor 24 and the base of which is connected to the output of an integrating circuit 25. This integrating circuit 25 receives the pulse-shaped signal $P_c$ formed in the regulator 13, as will be described hereinafter. The transistor 22 is the adjustable component of the amplifier 12. Actually, on the terminal 26 between the resistor 23 and the capacitor 24 a voltage is obtained which is a variable fraction of the input signal x of the amplifier, as its level depends on the more or less conductive state of the emitter-collector path of the transistor 22 and consequently on the output voltage of the integrating circuit 25. It can be easily seen that on the terminal 26 an increase of the output voltage of the integrating circuit 25 corresponds to a decrease of the level of the signal which is available on terminal 26 and conversely. This variable-level signal available on terminal 26 is, for example, a current $i_m$ which is applied to a fixed-gain amplifier circuit 27. At its output 28 the circuit 27 produces a variable current $I_m$ which is identical to the output signal W of the variable-gain amplifier 12. At its output 29 the circuit 26 produces a current $I_o+I_m$, wherein $I_o$ is a direct voltage having a constant amplitude. In the regulator 13 the current $I_o+I_m$ is applied to a pulse-width modulator 30. The latter further receives clock pulses from the clock generator 31 and produces a signal $P_m$ formed by pulses the width of which is modulated by the current $I_o+I_m$. The techniques of forming pulse-width modulated pulses are well-known. It is useful to state here that the clock pulses are, in particular, used to sample the input current of the modulator, $I_o+I_m$. When, at the sampling instants, the variable portion $I_m$ of this current is zero, the pulses of the signal $P_m$ have a width $P_o$. Depending on whether the variable current $I_m$ is positive or negative at the sampling instants, the pulses of the signal $P_m$ have a width which is larger or smaller than $P_o$. Pulses having a width $P_o+P_{m1}$ and $P_o-P_{m1}$, respectively correspond to a predetermined level of the variable current $I_m$ for which this current may take the value $I_{m1}$ and $-I_{m1}$. The modulated signal $P_m$ is applied to a pulse-length detector 32, which produces a pulse-shaped signal $P_c$ formed by pulses which are commonly referred to as compression pulses, which have a fixed duration and are produced each time the pulses of the signal $P_m$ reach the values $P_o \pm P_{m1}$. The pulse-shaped signal $P_c$ is applied to the integrating circuit 25 which produces a voltage which is representative of the pulse repetition rate of the compression pulses. Basically, said integrating circuit comprises a capacitor which is charged by a constant current during the duration of the compression pulses and discharged by a current which is lower than the charging current. In this manner, when compression pulses appear which indicate that the level of the current $I_m$ is exceeded, the voltage produced by the integrating circuit 25 increases, which makes the transistor 22 more conductive and produces an attenuation of the current level $I_m$. Finally, the voltage produced by the integrating circuit 25 stabilizes around an average value which determines a constant level of the current $I_m$. The amplifier 12, which is associated with the regulator 13, in accordance with the embodiment described in the foregoing, has precisely the required characteristic shown in FIG. 2, while the constant level $W_o$ indicated in said Figure becomes identical to the constant level at which the current $I_m$ is established.

The variable-gain amplifier 11 incorporated in the first path $C_1$ is of the same construction as amplifier 12; it comprises the same components designated by the same references, but provided with an accent notation. Said amplifier 11 is controlled by the pulse-shaped signal $P_c$ which is formed in the regulator 13 as described in the foregoing. The transistor 22', which is the variable component of the amplifier 11, is controlled by the same signal as the transistor 22 which is the variable component of the amplifier 12. If the components of the two amplifiers, particularly the transistors 22 and 22', are arrangement pair-wise in a suitable manner, the gain of the amplifier 11 is automatically adjusted at each instant to the same value as the gain of the amplifier 12.

Since the amplifier 11 has for its object to process the useful signal (for example the speech signal), and the amplifier 12 to process the oscillation signal of the loop, it may be useful to give the integrating circuits 25 and 25' different time constants, adapted to the signals processed by said amplifier. On the other hand, by having the pair-wise arranged transistors 22 and 22' controlled by the same signal, it may be advantageous to give the fixed amplifiers 27 and 27' different gains, the gains of the amplifiers 11 and 12 remaining in a constant ratio. Finally, it will be clear that one single integrating circuit may perform the function of the two integrating circuits 25 and 25' having the same time constant.

The circuit diagram shown in FIG. 5 is a suitable circuit diagram to realize the assembly of the amplifiers 11 and 12 and the regulator 13 in the arrangement of FIG. 1. But it will be obvious that with the same embodiment, the regulator 13 can control two variable-gain amplifiers which are connected in a different manner, or to control only one of these two amplifiers to realize the several variations shown in FIG. 3.

What is claimed is:

1. In an arrangement for avoiding sustained, annoying oscillations in a given frequency band in a closed-loop system, the arrangement comprising a variable-gain amplifier incorporated in a first path having input and output terminals and which forms part of the loop of said system, the improvement wherein a second path which has at least one part separate from said first path is provided between the input and output terminals of the first path, and further comprising means connected to ensure that the gain in the second path remains higher than the gain in the first path in said frequency band where the oscillations are liable to be produced, and means applying a signal formed in said part of the second path which is separate from the first path to the input of a linear regulator connected to control at least one variable-gain amplifier which forms part of the second path, to ensure that the signal at the input of the said regulator remains constant for a certain value of the said signal formed in the second path.

2. An arrangement as claimed in claim 1, characterized in that the second path comprises a variable-gain amplifier whose output signal is applied to the input of said linear regulator, this linear regulator controlling simultaneously said variable-gain amplifier of the second path and a variable-gain amplifier provided in the first path near the input terminal which is used jointly by the two paths or a variable-gain amplifier provided in the first path near the output terminal which is used jointly by the two paths.

3. An arrangement as claimed in claim 2, characterized in that the second path is connected by means of an attenuator circuit to the output terminal which is used jointly by the two paths.

4. An arrangement as claimed in claim 1, characterized in that the first and second paths comprise a common variable-gain amplifier provided near the input terminal which is used jointly by the two paths or a variable-gain amplifier provided near the output terminal which is used jointly by the two paths, one of these variable-gain amplifiers which are used jointly by the two paths being controlled by said linear regulator.

5. An arrangement as claimed in claim 4, in which the first and second paths comprise a common single variable-gain amplifier provided near the input terminal which is used jointly by the two paths or near the output terminal which is used jointly by the two paths, characterized in that the first path comprises inter alia a further variable-gain amplifier which is provided near the output terminal which is used jointly by the two paths or near the input terminal which is used jointly by the two paths and which is also controlled by said linear regulator.

6. An arrangement as claimed in claim 4 or claim 5, characterized in that the signal formed in that part of the second path which is separate from the first path is applied to the input of the linear regulator by means of a fixed-gain amplifier.

7. An arrangement as claimed in claim 4 characterized in that the signal formed in that part of the second path which is separate from the first path is applied to the input of the linear regulator by means of a variable-gain amplifier, which is also controlled by the linear regulator.

8. An arrangement as claimed in claim 4, in which the first and second paths comprise one common single variable-gain amplifier which is provided near the input terminal which is used jointly by the two paths, characterized in that the second path is connected by means of an attenuator circuit to the output terminal which is used jointly by the two paths.

9. An arrangement as claimed in claim 4 in which the first and second paths comprise a common, single variable-gain amplifier which is situated near the output terminal which is used jointly by the two paths, characterized in that that part of the second path which is separate from the first path is connected to the input of the said common amplifier by means of an attenuator circuit.

10. An arrangement as claimed in claim 4, in which the first and second paths comprise two jointly used variable-gain amplifiers which are provided near the input and output terminals which are used jointly by the two paths, respectively, characterized in that that part of the second path which is separate from the first path is connected by means of an attenuator to the input of the common amplifier which is provided near the output terminal which is used jointly by the two paths.

11. An arrangement as claimed in claim 1 characterized in that a filter is arranged in that part of the second path which is separate from the first path, before the place where the signal is formed which is applied to the input of the linear regulator, so as to selectively increase the gain in the second path.

12. An arrangement as claimed in claim 11, characterized in that the filter of the second path is a filter having a narrow passband.

13. An arrangement as claimed in claim 11, characterized in that the filter of the second path is a high-pass filter.

14. An arrangement as claimed in claim 11 characterized in that a filter is arranged in that part of the first path which is separate from the second path, for selectively increasing the gain of the first path in the same frequency band as the passband of the filter of the second path.

15. An arrangement as claimed in claim 11 characterized in that a filter is provided before the input terminal which is used jointly by the two paths, or after the output terminal which is used jointly by the two paths, or in the parts which are used jointly by the two paths, for increasing the gain of the assembly formed by the two paths in the same frequency band as the passband of the filter of the second path.

16. An arrangement as claimed in claim 1 characterized in that the linear regulator comprises a pulse-width modulator which receives a signal which corresponds to the signal applied to the input of said regulator, a pulse-length detection circuit which produces a compression pulse each time the width of the pulses produced by the modulator reaches a value which indicates that the level of the signal at its input is exceeded, the said compression pulses being applied to an integrating circuit the output signal of which controls the variable component of the variable-gain amplifier or amplifiers controlled by the regulator.

17. The arrangement of claim 1, wherein said arrangement comprises a large speaking telephone set, characterized in that the coupling circuit coupling the set to a telephone line is included in that part of the first path which is separate from said second path.

18. The arrangement of claim 1, wherein in said arrangement is an electro-acoustic system.

19. The arrangement of claim 1, wherein in said closed-loop system comprises part of a control system.

* * * * *